US005564144A

United States Patent [19]
Weingartner et al.

[11] Patent Number: 5,564,144
[45] Date of Patent: Oct. 15, 1996

[54] VEHICLE SEAT WITH A SEAT PADDING, IN PARTICULAR FOR AN AIRCRAFT SEAT

[75] Inventors: Rudolf Weingartner, Neuhofen; Johann Möseneder, Grieskirchen, both of Austria

[73] Assignee: C.A. Greiner & Söhne Gesellschaft m.b.H., Kremsmünster, Austria

[21] Appl. No.: 328,421

[22] Filed: Oct. 25, 1994

[30] Foreign Application Priority Data

Nov. 3, 1993 [AT] Austria ..................... 2209/93

[51] Int. Cl.⁶ .................................................. A47C 27/00
[52] U.S. Cl. .................. 297/452.27; 297/452.53
[58] Field of Search ..................... 5/463, 464, 653, 5/481; 297/452.27, 452.37, 452.53

[56] References Cited

U.S. PATENT DOCUMENTS

| | | | |
|---|---|---|---|
| 3,070,402 | 12/1962 | Stanton | 297/452.27 |
| 3,393,012 | 7/1968 | Chancellor, Jr. | 5/653 |
| 3,642,323 | 2/1972 | Taylor | 297/452.37 |
| 3,732,586 | 5/1973 | Frey | 5/464 |
| 3,833,260 | 9/1974 | Harder | 297/452.37 |
| 4,004,305 | 1/1977 | Rubin | 5/464 |
| 4,060,280 | 11/1977 | Van Loo . | |
| 4,463,465 | 8/1984 | Parker et al. . | |
| 4,522,447 | 6/1985 | Snyder et al. | 5/653 |
| 4,726,086 | 2/1988 | McEvoy | 5/653 |
| 4,930,171 | 6/1990 | Frantz | 5/464 |
| 5,283,918 | 2/1994 | Weingartner et al. . | |
| 5,439,270 | 8/1995 | Owen | 5/653 |

FOREIGN PATENT DOCUMENTS

| | | |
|---|---|---|
| 0190064 | 8/1986 | European Pat. Off. . |
| 438186 | 7/1991 | European Pat. Off. . |
| 8506816 | 9/1985 | Germany . |
| 4208600 | 4/1993 | Germany . |
| 1241829 | 8/1971 | United Kingdom . |
| 2006618 | 5/1979 | United Kingdom . |
| WO88/09731 | 12/1988 | WIPO . |

*Primary Examiner*—Michael J. Milano
*Attorney, Agent, or Firm*—Collard & Roe, P.C.

[57] ABSTRACT

The invention relates to a vehicle seat with a seat padding (4), in particular for an aircraft seat, of the type comprising a supporting body (6) of foamed plastic, which consists of a supporting part (7) of a resilient plastic foam (42) having a first specific gravity and a sitting part (8) of a resilient plastic foam with a second specific gravity which is less than the specific gravity of the supporting part (7) and an upholstery material (62), which are connected, in particular are glued in places together. Between the supporting body (6) and the upholstery material (62), if required, a flame-resistant intermediate layer (51) formed from a lattice or from high temperature-resistant fibers or threads (52), is arranged in a lattice form. At least over a portion of the thickness (12) of the supporting part (7) and/or of the sitting part (8) between a front and/or back leading edge (11, 25) of the supporting part and/or sitting part (7, 8) and approximately in a central region thereof, an insert piece (9,84) is arranged. The latter has a greater hardness than the supporting and/or sitting part (7,8). The specific gravity of the insert piece (9,84) is less than the first specific gravity of the supporting part (7).

44 Claims, 6 Drawing Sheets

VEHICLE SEAT WITH A SEAT PADDING, IN PARTICULAR FOR AN AIRCRAFT SEAT

BACKGROUND OF THE INVENTION

1. Field of the Invention

The present invention relates to a vehicle seat with a seat padding, in particular for an aircraft seat.

2. The Prior Art

The invention relates to a seat cushion as described in the generic part of claim 1.

A known seat with a padding of foamed plastic—in accordance with WO-A1 -87/06894 of the same applicant—consists of a foamed plastic with a supporting body made of an open-cell elastic plastic foam having a first specific gravity and with a flame-retardant layer made of an open-cell elastic foamed plastic, provided with flame retardant, having a second specific gravity different from the first. The plastic foam and the flame-retardant layer are connected with each other, in particular through a foaming process, and are surrounded by an upholstery material which is highly flame-resistant. In order to achieve a sufficient permeability to air of such a padding, it was also proposed, after the completion of the padding, to push needles through this padding, so that a corresponding exchange of air is possible. These paddings have proved, in themselves, to be very good in practice, but it has been found however, that especially in extreme weather conditions or under various climatic conditions the comfort of the seats was not sufficient for the planned purpose of use in vehicles.

In addition, seats for public transport are already known—in accordance with DE-GM 85 06 816—which have a seat padding which is covered with a seat upholstery, in which the seat upholstery and the seat padding consist of a highly flame-resistant and smokeless material. Frequently, one proceeds here such that between that flame-resistant seat upholstery and the seat padding, which mostly consists of plastic foam, a glass fibre mat is arranged, which is intended to prevent the seat upholstery from burning through in the direction of the seat padding. However, it has been found here that in many cases the action of the flames originates from the floor, and the plastic foam of the seat padding tends to burn with the development of thick smoke, whereby the public transport is filled with smoke in a very short period of time, when fire occurs, so that it is scarcely possible for the occupants to find their way. Accordingly, in this known seat, provision is made that beneath the seat padding in the supporting frame of the seat a fire-resistive plate is arranged. Therefore, a particular section must be used to hold the seat padding and also additional production costs are necessary for arranging the fire-resistive plate. Also, the seat ventilation was not satisfactory in this form of embodiment.

Seats with paddings of foamed plastic are very widely used in modern vehicle construction. Above all, they are used in rail and road vehicles, but also, predominantly in aircraft. Whilst the regulations which apply to rail vehicles as regards the self-extinguishing structure of the materials used or as regards the generating of smoke, prescribe very strict guidelines, these regulations are further exceeded by the regulations which apply in the aircraft industry. Thus, in seats which are permitted for use in aircraft, a test is prescribed, in which the paddings are directly exposed to a flame from a burner, in their composition as provided for installation. This flame acts directly on the padding for a period of 2 minutes after which the flame is extinguished or removed. If the flames do not extinguish themselves by then, the padding is extinguished after 5 minutes. After this fire test, the weight loss of the padding must not be higher than 10%. In order to fulfill these extremely strict regulations, and at the same time to achieve a high degree of comfort in the seats in the case of long-haul flights, and to achieve a low weight, seat paddings of various elastic, open-cell soft foam materials, provided with flame retardants, and having differing specific gravities, were glued together.

Such a known vehicle seat—according to EP-A1 190 064—consists of several layers of needle batt, which are surrounded by a non-flammable upholstery material. Between the upholstery material and the individual layers of needle batt, reinforcement mats of metal or respectively glass fibres are arranged, in order to reduce damage by vandals. Through the glueing of the individual layers and the many intermediate layers, it is even more difficult to achieve a sufficient ventilation in the known vehicle seat.

In another known seat for aircraft, in order to create the complex spatial profiling of the seat paddings more simply, the supporting body is formed from a piece which is treated with flame retardants and is foamed in one piece in a mould, the surface of which piece is covered with a flame-retardant layer and thereafter with a non-flammable upholstery material. In the known seats, however, the new, increased safety specifications and testing regulations for aircraft seats could not be fulfilled.

SUMMARY OF THE INVENTION

It is an object of the present invention to create a seat padding which copes with the extraordinary stresses of seat paddings, in particular in public transport, especially aircraft seats and with a long durability to facilitate maintenance, in particular keeping such seat paddings clean and to provide a seat padding which is comfortable to sit on even over a lengthy period of use.

This problem of the invention is solved in that at least over a portion of the thickness of the supporting part and/or of the sitting part between a front and/or back leading edge of the supporting part and/or sitting part and approximately a central region thereof, an insert piece is arranged which has a greater hardness than the supporting and/or sitting part and that the specific gravity of the insert piece is less than the first specific gravity of the supporting part. It is an advantage of this construction of the seat padding that due to the greater hardness of the insert piece, a resistance zone is formed which is secure with respect to height and which is less compacted in the direction of the thickness of the seat padding than the surrounding regions of the supporting part and/or sitting part. Due to its higher deformation resistance in the case of pressure loads, this insert piece acts as a kind of barrier or abutement piece, which prevents that an inclined, slanting plane occurs against the bearing face of the vehicle seat due to the higher weight when sitting with the backside in the region of the from edge of the seat padding giving the user of the seat the feeling that he slips off the seat. This action of the abutement piece builds up a holding resistance which gives the user even when he sits badly or is in a sitting position whereby the backside is in the front region of the vehicle seat, that he can take a quiet and relaxing seat position even if the seat is inclined, without the feeling that he may slip down to the floor at any moment. By this action of the abutement piece it is now possible that such a seat padding can withstand the strict tests in particular with loads inclined diagonally towards the front in a sitting direction up to 16 G without the loss of the protective effect of the seat padding and that the user slips off the seat. Additionally, by this deliberate reinforcement, in particular by the protective wall in the region of the front side of the vehicle seat, the resilient properties and the well-being is even more improved by the soft sitting part or the central layer and the elasticity properties under this stiffening of the marginal portion in the sitting region facing towards the hollow of the knee associated with the sitting area cannot be changed disadvantageously. This way, an improved comfort of the seat is achieved against any expectation in spite of the insertion of a harder and stiffer insert piece, and thereby also the supporting ability and the durability of the seat padding by the deliberate reinforcement in this front region. Additionally, the durability and the spring properties of the sitting part are also improved since the latter is protected from excessive stress in the region of the front edge of the seat padding by means of excessive compression in the direction of thickness and thereby higher flexing stresses with respect to the support frame for the seat padding. It is, in addition, also possible by means of the harder insert piece along the upper edge thereof facing towards the sitting part, to separate the central layer and also the connection between the sitting part and the insert piece, so that for example after a certain period of use the sitting part is removed together with the central layer and based on the mostly high degree of soiling due to humidities and liquids entering from above can be replaced by a new sitting part with a new central layer, and thereby the supporting part which is secure with respect to height can be used for a longer period of time due to the reinforcement of the insert piece.

An embodiment wherein at least over a portion of the thickness of the supporting part between a rear end edge of the supporting part and approximately a central region thereof, a further insert piece is arranged which has a greater hardness than the supporting part and wherein the specific gravity of the insert piece is less than the first specific gravity of the supporting part, is also advantageous, because a greater bearing strength of the seat padding can be achieved during vertical pressure loads in the direction of the supporting frame without breaking the seat padding in two. This way, the users are protected from injuries resulting from metal pieces entering from the supporting frame in the case of a vertical impact, for example the impact of an aircraft on the landing strip. Here, it is particularly advantageous that in the case of a closed-cell structure of the supporting body the latter collapses when stressed perpendicularly, and like in the case of a damping element causes the destruction of energy, which leads to the fact that the stress acting on the body of a user of such a seat padding is reduced and thereby the risk of injury becomes even less. This damping effect develops due to the compression of the cell structure of the closed-cell insert piece resulting from the vertical load and loss of energy resulting therefrom. Thus, it is possible to use such seats advantageously, even when they are subjected to strict testing, as is for example prescribed for aircraft, wherein the seat paddings must withstand a load of 14 G.

In a further development of an embodiment wherein the insert piece and the further insert piece have identical specific gravity and/or identical hardness, it is achieved, in case of a strong vertical load, for example at an impact, that the insert pieces are deformed evenly by the collapsing cell structure in a vertical direction whereby a regular delay is achieved over the entire seat surface so that one cannot fall out of the seat even when the cell structure of the insert pieces is collapsing.

In an embodiment wherein the insert piece and/or the insert piece extends over a height which corresponds to a thickness of the supporting part of 20 to 80%, preferably 30 to 50%, it is further achieved that the increased strength does noch change the well-being or the sitting comfort.

Another variant embodiment of the invention describes that the insert piece consists of a polyethylene foam which achieves great stiffness with a long life span and low weight of the insert piece, which at the same time shows high resistance against fire.

A further advantageous development describes that the insert piece has a specific gravity of 15–50 kg/m$^3$, preferably 25 kg/m$^3$ which lowers the total weight of the seat padding since the specific gravity in the insert piece which is secure with respect height, is decreased. Since the weight is less, operating costs can be saved over the period of use of the seat.

However, an embodiment is also possible wherein the hardness of the insert piece requires from 30 to 100 kPa at 40% impression depth, because the sinking into the highly stressed edge region of the seat padding is thereby reduced and an unwanted inclination of the seat surface can be prevented in the direction of the front edge of the chair.

An advantageous further development describes that the hardness of the supporting part is from 350 N to 550 N, preferably 400 N, whereby the sitting comfort of the user is increased in the region of the buttocks and wherein by means of the insert piece, which is secure with respect to height, an abutment is ensured in the region of the front edge of the seat padding against the slipping off of the backside in the direction of the front edges of the seat padding.

Another development wherein the hardness of the sitting part is from 120 N to 300 N, preferably 180 N is also possible. This achieves in a simple way an increased sitting comfort and good elasticity in the region of the sitting surface.

Furthermore, a further development wherein the insert piece consists of a closed-cell plastic foam, in particular of polyethylene (PE-foam) is advantageous because moisture absorption by the insert piece is greatly reduced and the fire bearing capacity of the insert piece is increased.

An advantageous further development is described wherein the insert piece in the region of its from edge on the side facing away from the sitting part is formed by a shank projecting over the underside of the supporting part and/or the insert piece, because it ensures a perfect support and fixation of the seat padding on its support frame, in particular when exposed to stresses from the front edge in the direction of the seat back without any disadvantageous changes in the stability of the seat padding.

However, a construction is also possible wherein the support face between a connecting area which is associated immediately adjacent with a front and/or rear face of the supporting part and/or sitting part and an upper side of the insert piece and/or the further insert piece is inclined about an angle and/or spatially deformed, in particular in a convex manner, because the arrangement of this support face achieves a smooth transition between the parts of the seat padding with less hardness and greater hardness without any discomfort felt by the user due to this transition.

An advantageous further development is described wherein the support face is formed by an inclination extending in the direction of the width of the seat padding and which is inclined about an angle to the connecting face in the direction of the front edge and/or the rear end edge of the insert piece, which achieves a favorable support of the backside of the user on the insert piece according to anatomical conditions.

Furthermore, a construction wherein the insert piece extends over the whole width of the supporting body is advantageous because in any sitting position and sidewards bending of the user of such a seat the development of resistance against slipping off the seat is guaranteed.

An advantageous further development is described wherein the insert piece extends only over a portion of a thickness of the supporting part and by its length extending parallel to the width of the seat padding via projections constructed like support legs projects beyond the region of the underside of the supporting part or beyond the face of the shank. Here, it is advantageous that the flexibility of the insert piece in a direction perpendicular to the sitting surface can be easily adjusted and in spite of it sufficient resistance can be built up against any slipping out of the seat.

But a construction is also possible wherein the insert piece projects over a portion of a thickness of the sitting part which corresponds to a maximum of 30% of the thickness of the sitting part into the latter, whereby the softer regions of the sitting part which are arranged to stand forwardly from the insert piece are giving in into a direction strength perpendicular to the seat surface and therefore increase the roll-on effect of the insert piece even more.

An advantageous further development is described wherein the insert piece is provided with several support faces which are offset to one another in the direction of the depth of the insert piece, for example arranged in a flake-shaped or step-like manner, because thereby the resistance which develops against any slipping out of the seat becomes stronger and stronger the greater the slanted position of the user in the seat of the vehicle without the user finding it disagreeable.

An embodiment wherein the plastic foam of the insert piece is non-flammable, or mixed with a flame-resistant agent to increase the burning resistance, is also possible because such a seat padding can also pass the most difficult safety tests and fire tests for an aircraft seat, since the loss of weight of the seat padding can be kept at a minimum during the fire test.

A further development wherein a spring core is arranged between the insert piece and a further insert piece and/or a rear end edge of the supporting part is also advantageous because thereby the supporting part reaches a strength which allows for a longer duration of use.

However, a construction wherein an upper side of the spring core is arranged at a distance beneath the upper and/or underside of the supporting part is also advantageous because differing spring resistances can be easily balanced out over a crosssection of the spring core and friction areas between the spring core and the adjacent metal parts can be prevented.

But a further development wherein between the spring core and the underside of the supporting part, an intermediate layer of wear-resisting and abrasion-proof material is arranged as a pressure distributing layer, is also advantageous. Thereby, excessive stresses and destruction of the supporting body between the spring core and the covering layers can be prevented.

In addition, an embodiment wherein on the underside of the supporting part and/or the insert piece, a protective layer, for example a flame-retardant upholstery material is arranged, preferably by adhesive points spaced apart from one another, is also possible. Such an embodiment prevents that too much of the upholstery material is consumed by fire if a fire breaks out.

A further development of an embodiment wherein the central layer is formed by a batt of at least one layer of fibres consisting of needle-punched or thermally connected fibres or threads of synthetic material and/or natural materials, which preferably are needled onto a substrate layer is possible so that a comfortable sitting climate on the seat padding is achieved.

Another form of an embodiment is also advantageous wherein the substrate layer is formed by a lattice or mesh of fibres or threads of polyester for example, or of a 100% polyamide and/or which has a weight of 15 to 90 g/m$^2$, preferably 35 g/m$^2$, because thereby the resistance against tear is increased and the extension of the total composite structure of the fibre layer and the substrate layer caused by the force exerted thereon, can be adapted to different extension properties. Moreover, by determining the weight of the substrate layer of 15 to 90 g/m$^2$, a good average value between the weight and the mechanical load of the substrate layer can be achieved.

An embodiment is also advantageous wherein the substrate layer consists of a fabric or knitted material of fibres or threads made of plastic, in particular a preoxidised polyacrylate and/or polyamide, glass filaments and/or natural material because thereby due to the composition and the construction as fabric or knitted material of the substrate layer, the latter can be rapidly adapted to different strength and resistance conditions such as to an accordingly high protection from flames.

An embodiment wherein the substrate layer is constructed as a net and the net threads or fibres consist of polyester or polyamide, makes it possible when flames act on the seat, to reduce the effect of a fire on the supporting body arranged thereunder by means of the net structures, whereby, based on the thickness of the net threads or fibres an appropriate resistance against fire or a prescribed duration of the flame action can be achieved without the net or lattice burning through.

In a preferred version of an embodiment wherein the strength of the fibres or threads has a dtex of 22/1 or 44F10, a resistant substrate layer is achieved by the fibre and threadstrength, which, however, still has sufficient flexibility and extension so that the feeling of sitting and comfort does not suffer.

According to another version of an embodiment wherein the net or lattice or respectively fabric or knitted material forming the substrate layer comprises80 to 180, preferably 130 to 140 stitch rows/dm length, a corresponding mesh density ensures that when flames are acting on the batt or its supporting layer, the fire is kept to such limits that the plastic foam of the supporting body cannot ignite or that the developing burns can be kept at a minimum with respect to volume. Thereby it is achieved that the smoke load is less when the plastic material is melting and that the regulations for seat production, in particular for aircraft seats can be adhered to.

An embodiment wherein the net or lattice or respectively fabric or knitted material forming the supporting layer comprises 40 to 140, preferably 60 to 120 stitch wales/dm length, achieves that the supporting layer in one of its main directions, for example in its width shows a greater extension allowing for a greater tensile strength in the longitudinal direction and at the same time due to the greater extension in a direction running transversely thereto for a sufficient comfort of the seat.

A further embodiment wherein the fabric or knitted material consists of three times 400 to 1500, preferably 580 to 1160 threads/surface unit, achieves a cost-effective production of the substrate layer having a sufficient density and close meshing so that the mounting of the upholstery material is not impeded and that at the same time a long-wearing surface is created when the upholstery material is removed in order to achieve a long lifespan of the seat padding even if the upholstery material is exchanged very often as is in particular necessary for passenger seats in different vehicles, in particular aircraft.

A further development wherein the net of the substrate layer has a longitudinal or transverse extension from 30 to 50%, preferably from 34 to 44% is also advantageous, because the extensions of the substrate layer are enough to create a pleasant sitting comfort, on the other hand however, an excessive stress of the supporting body which is arranged underneath said layer is reliably prevented by tightly limited overloading.

A further development of an embodiment wherein the net forming the substrate layer withstands a maximum tensile force longitudinally and/or transversely from 200 to 500 N is advantageous, because it does not tear due to high maximum tensile forces which may occur when kneeling on cushions or when putting down heavy suitcases.

Another further development wherein the tearing strength of the net forming the substrate layer is transversely and longitudinally from 240 to 500 N/cm, achieves that the padding can also be attached to the support frame or the like by means of the substrate layer, when excessive stress through walking takes place without any provision to be made for additional fastening means, which, in particular saves weight in such seats.

By a structure of the fibre layer wherein the fibre layer consists predominantly of fibres and threads of natural material, for example wool or cotton, which are preferably mixed with a portion from 5 to 20%, preferably 10% of polypropylene or polyethylene or polyacrylate fibres or threads, an easy adaptation to the climatic conditions of the batt produced therefrom can take place.

An embodiment of the fibre layer wherein the fibre layer consists predominantly of fibres or threads of synthetic material such as polypropylene and/or polyethylene and/or polyacrylate and/or polybenzimidazole, and wherein at least a portion of these fibres or threads have a fusion temperature of more than 1000° C. is also advantageous since the batt by itself can inhibit the fire or flames in a simple manner.

If however synthetic fibres or threads are used according to an embodiment wherein a portion of the fibres or threads of the fibre layer are formed from synthetic material and the latter consists of thermoplastics, it is easily possibly to bond thermically and to strengthen the batt by placing it under pressure and by supplying heat simultaneously.

Thereby, an embodiment wherein the fibres or threads of the fibre layer comprise synthetic materials having a plasticizing or melting point of between 100° and 150° C., preferably of between 100° and 120° C., proves to be advantageous because relatively low temperatures do not change the basic structure of the fibres or threads, a thermal compression or in a heated state an adhesion of the threads can be achieved, whereby when keeping the forming achieved under pressure until the cooling of the fibres or threads below the freezing point, the form produced under pressure can also be maintained in a cooled state.

High tear-out strength and loading capacity of the batt or the fibre layer is achieved by a fibre or thread structure wherein the fibres or threads of the fibre layer, in particular of polypropylene or aromatic amide or polyamide have a length of 40 to 80 mm and wherein the fibres or threads of the fibre layer, in particular of polypropylene or aromatic amide or polyamide are produced from filaments.

Here, a further embodiment wherein the batt is thermally compressed to a surface weight of between 300 and 500 g/m² is favourable as the thermal compression causes a stiffening of the fibres and threads, and thereby a higher tensile strength.

The specific gravity of an intermediate layer according to the invention can be kept low by a further development wherein the intermediate layer is connected to the fibres or threads of the fibre layer of the batt through needle punching and/or wherein the intermediate layer is arranged in a surface area of the batt opposite the substrate layer, because an additional adhesive layer to connect the intermediate layer with the fibres or threads of the fibre layer of the batt can be saved.

In addition, a version of an embodiment wherein the intermediate layer consists of a net or lattice or fabric or knitted material or the like of glass and/or metal and/or ceramic and/or carbon fibres and/or threads is also advantageous as together with the substrate layers very high and permanent resistance against the entry of flames is achieved.

Further advantages result from further developments wherein the intermediate layer has a weight of approximately 80 to 185 g/m², preferably 120 g/m², wherein the connecting device is arranged between the batt or the substrate layer and the upholstery material, and wherein the connecting device is formed by a burned tape or a supporting tape for a zip fastener.

BRIEF DESCRIPTION OF THE DRAWINGS

For a better understanding of the invention, it is explained hereinafter in further detail, by way of example only, of the accompanying drawings, in which.

DETAILED DESCRIPTION OF PREFERRED EMBODIMENTS

Figure 1:
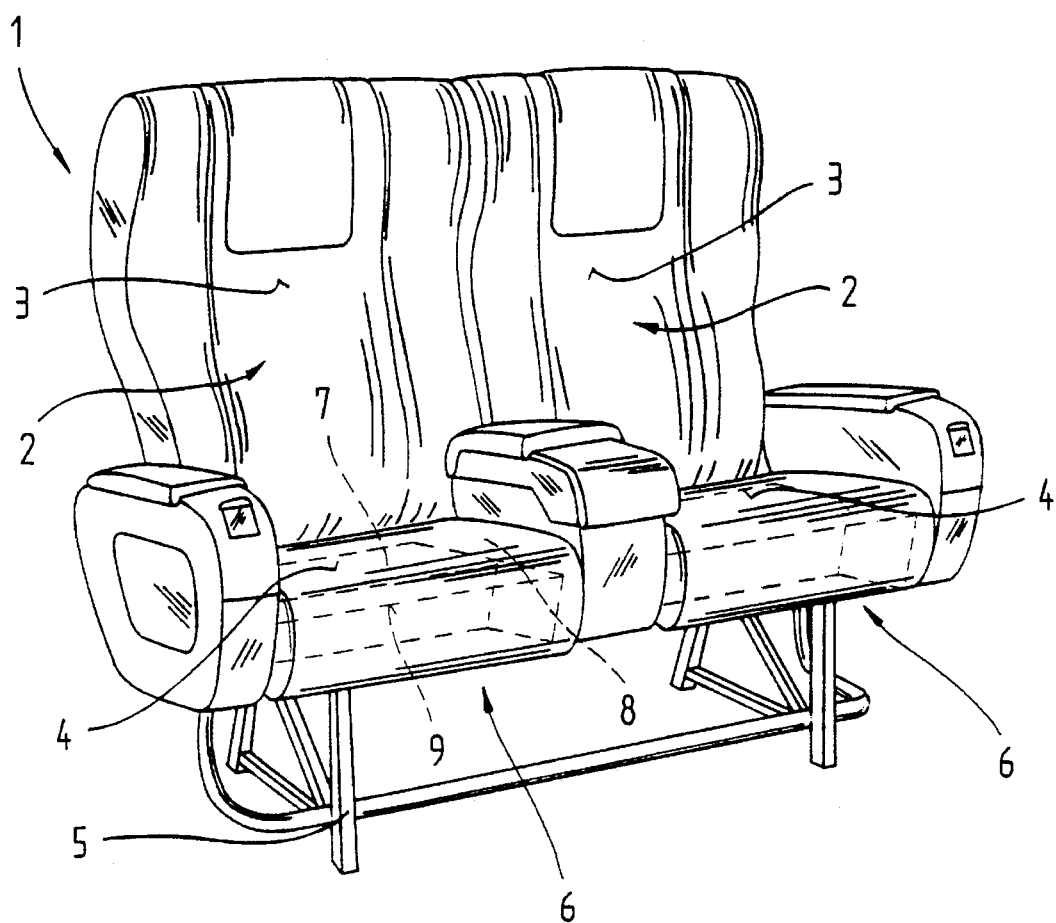
FIG. 1 shows a double bench seat with seat paddings according to the invention and back rests in diagrammatic representation.

FIG. 1 shows a double bench seat 1 with two seats 2, each of the seats 2 consisting of a back rest 3 and a seat padding 4. The seat paddings 4 of the seats 2 are of identical construction. The back rest 3 and the seat padding 4 are placed into a supporting frame 5. The supporting frame 5 may also have any other desired shape.

As indicated schematically, the seat padding 4 has a supporting body 6 which is formed from a supporting part 7 and a sitting part 8, and also an insert piece 9. The sitting part 8 overlaps in its depth extension the supporting part 7 and also the insert piece 9.

Figure 2:
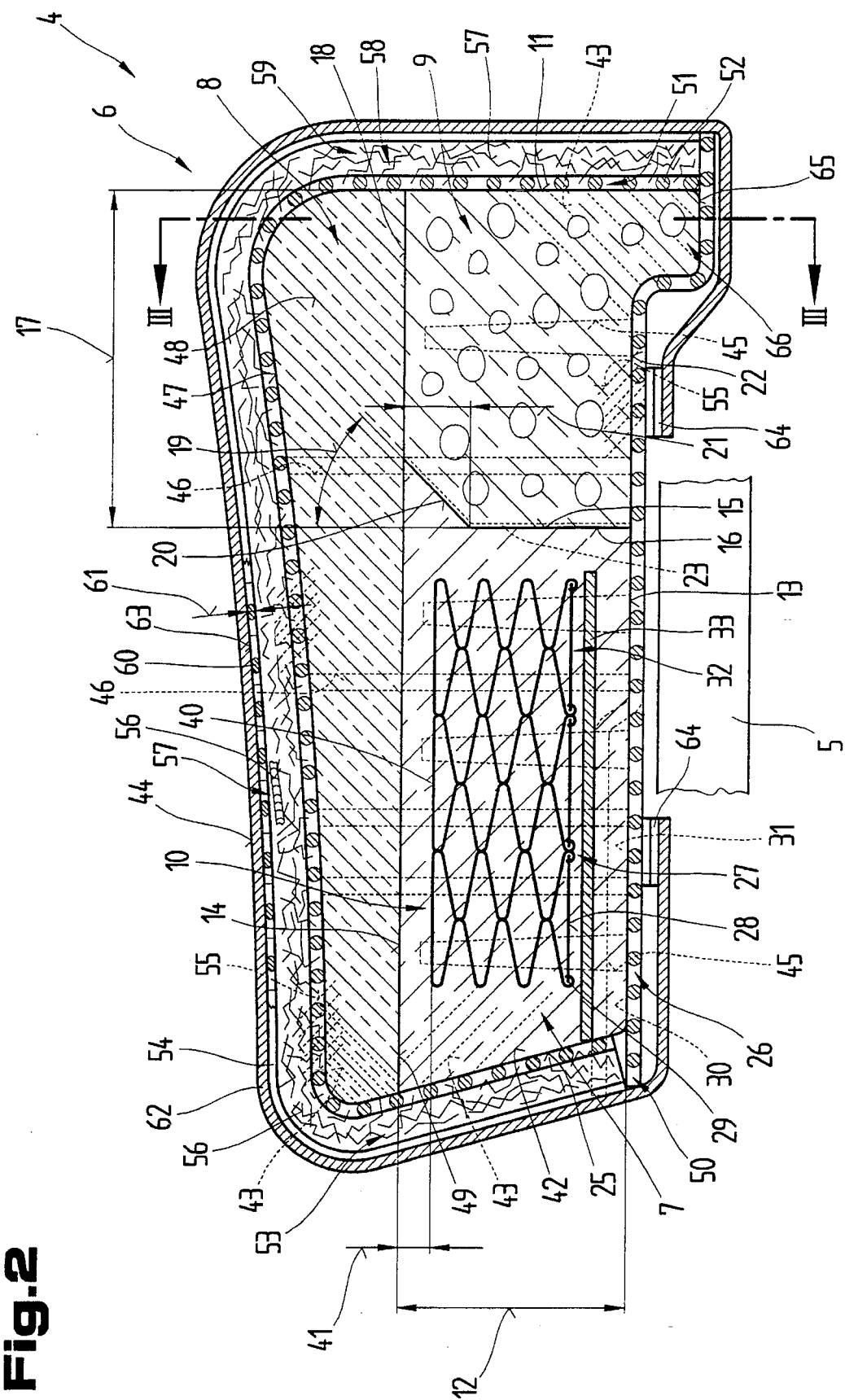
FIG. 2 shows a seat padding according to the invention consisting of a sitting part, a substrate part and an insert piece, in side view, in a section taken along the lines II—II in FIG. 3.
Figure 3:
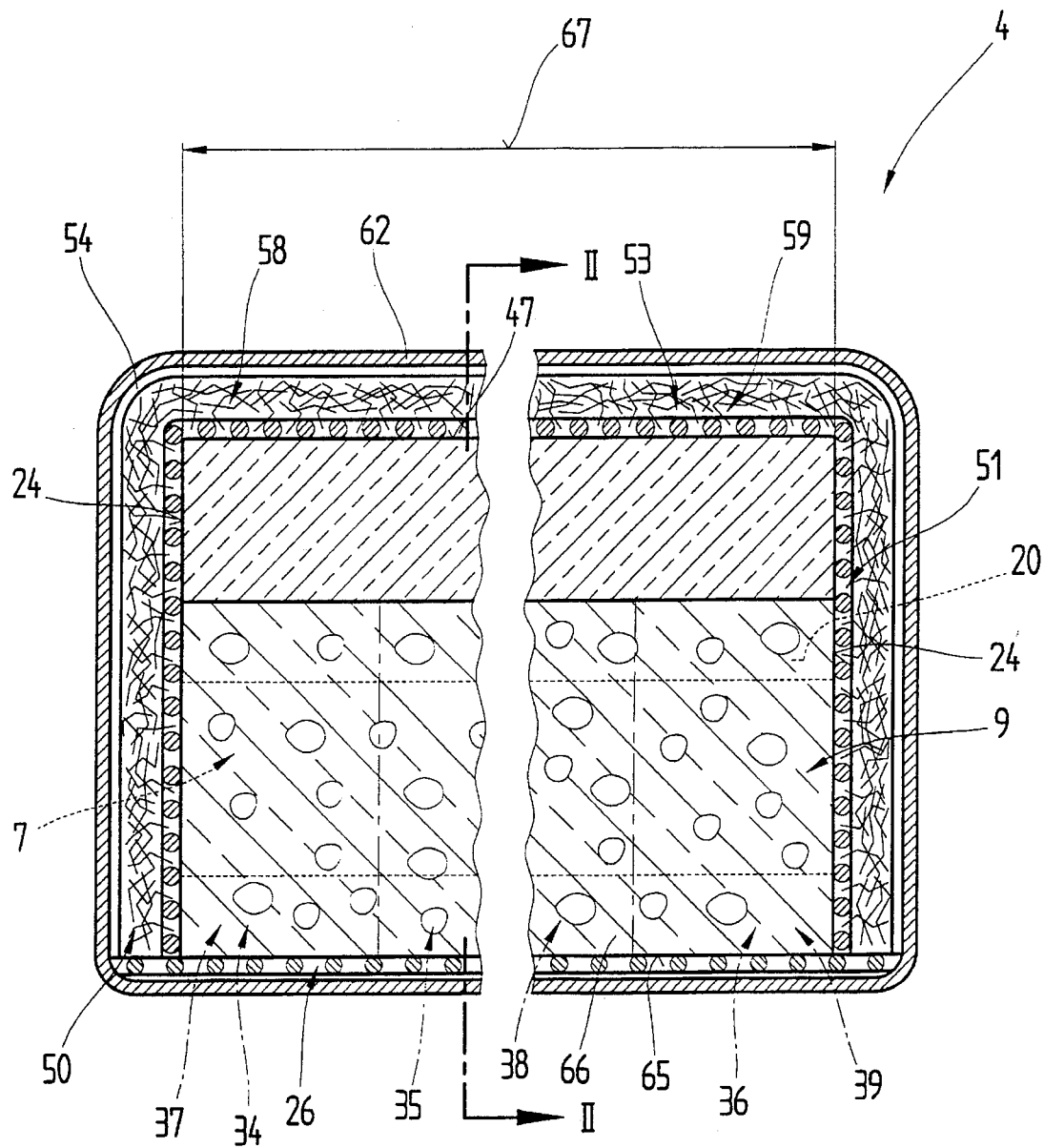
FIG. 3 shows a seat padding according to the invention, in front view, in a section taken along the lines III—III in FIG. 2.
Figure 4:
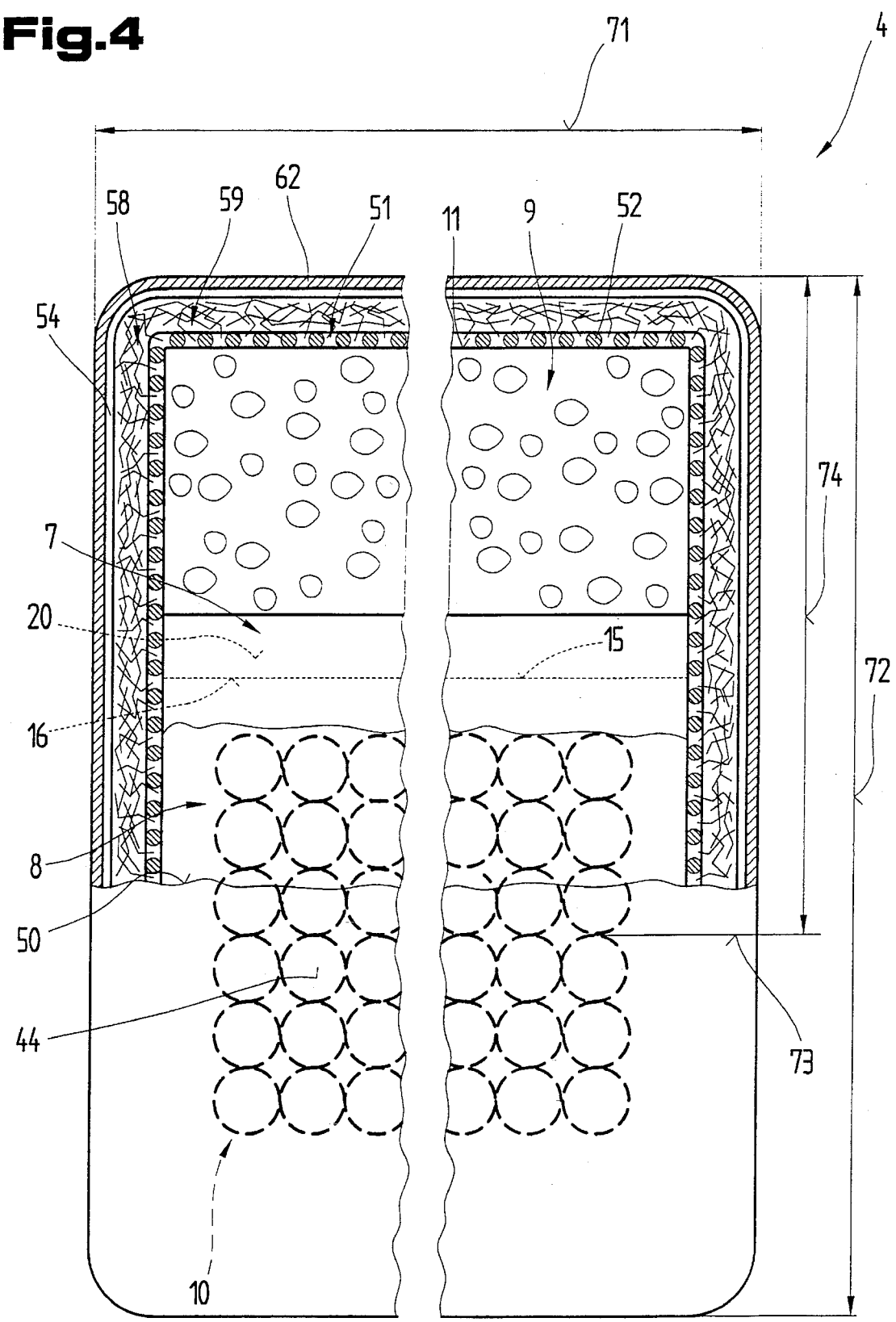
FIG. 4 shows the seat padding of FIGS. 2 and 3, in plan view, partially cut.

The embodiment of the seat padding 4 according to the invention can be seen in further detail from FIGS. 2 to 4.

As can be further seen in detail from the illustrations, a spring core 10 is embedded in the supporting part 7. This spring core lies in a rear half of the seat padding 4 facing away from a front edge 11, and extends almost over a full thickness 12 of the supporting part 7, i.e. from an underside 13 to an upper side 14. Further to a face 15 of the supporting part 7, the insert piece 9 extends with its connecting surface 16 in the direction of the front edge 11 of the seat padding 4. Thereby, the insert piece 9 has a depth 17, which, at a depth of between 40 cm and 60 cm of the seat padding 4, is of between 30 mm and 200 mm between the front edge 11 and the face 15. It is essential that the connecting surface 16 of the insert piece 9 is not extending over the total thickness 12 but in the region of an upper side 18 is provided with a support face 20 which is inclined about an angle 19 in the direction of the front edge 11. The support face 20 extends at a distance 21 from the upper side 18 towards an underside 22 of the insert piece 9. The connection between the connecting surface 16 or the support face 20 of the insert piece 9 with the face 15 of the supporting part 7 can take place on the one hand for example in that the supporting part 7 is foamed on the insert piece 9 during a foaming process or, on the other hand, as indicated by broken lines, by a special bonding layer 23. The bonding layer 23 can consist of fusible adhesive foils for example, melting powder which reacts to heat, etc.

The undersides 13 and 22 with the exception of the lateral edges 24, a rear end edge 25 and the upper side 14, are surrounded by a protective layer 26, which in some areas is connected with the supporting part 7 or the insert piece 9 by adhesive points spaced a distance apart from one another.

The insert piece 9 consists of a polyethylene foam having a specific gravity of between 15 and 50 kg/m$^3$, preferably 25 kg/m$^3$ at a hardness of between 30 and 100 kPa at 40% compression depth. The insert piece 9, which consists preferably of a polyethylene foam, presents thereby preferably a closed-cell plastic structure.

Furthermore, FIG. 2 shows a preferred further development, which is not imperative, wherein node points 27 of longitudinal or respectively transverse wires 28, 29 are arranged in the region of grooves 30 in the underside 13 of the supporting part 7. Consequently, the projections 31 lying between the grooves 30 project over a lower bearing face 32 of the spring core 10, so that when the seat padding 4 lies on a flat-surfaced supporting frame 5, premature destruction of the protective layer 26 by the node points 27 cannot occur or respectively in these regions a longer lifespan of the protective layer 26 is achieved.

In addition, it is, moreover, also possible, however not imperative, for example at least between the bearing face 32 of the spring core 10 and the underside 13 or respectively the protective layer 26 arranged thereon, to arrange an intermediate layer 33 of high-strength fibres or threads in the manner of a knitted material, net, lattice or the like, which may consist of metal, carbon, plastics, ceramics or the like, and additionally or at the same time may also be resistant to high temperatures. Moreover, if desired, this intermediate layer 33 may also extend over the front edge 11, the lateral edges 24 and the rear end edge 25, i.e. over the entire surface with the exception of the upper side 14.

The supporting part 7 may be produced in one piece from a foamed plastic. This plastic foam may be open-celled and may moreover, have different elasticity values adapted to the respective case of usage. The specific gravity of the supporting part is of between 15 kg/m$^3$ and 30 kg/m$^3$, preferably 25 kg/m$^3$ at a hardness of between 350 N and 550 N, preferably 400 N.

Of course, in a modification of this embodiment, it is also possible, however, to compose the supporting part, as indicated schematically by dot-and-dash lines in FIG. 3, from several layers 34, 35, 36 of different foamed plastics 37, 38, 39.

However, an embodiment is particularly preferred, in which the spring core 10 is foamed or respectively formed into the supporting part 7. Here, it is possible to prestress the spring core 10 in the foaming mould for the supporting part 7, i.e. to give a higher elastic force in accordance with the physical properties of springs, or respectively to achieve a corresponding spring behaviour by using a smaller wire thickness of the springs. Thereby, however, it is also possible, to keep the weight of the spring core 10 low, and thus also that of the supporting part 7. Thus, an upper side 40 of the prestressed spring core 10 is at a distance 41 from the upper side 14 of the supporting part 7. This distance is preferably of between 5 mm and 70 mm.

The supporting part 7 preferably consists of a shaped cold foam, which is produced in a mould corresponding to the desired outer dimensions of the supporting part. Generally, it consists of an elastic open-cell plastic foam 42, for example polymethane foam. Preferably, it is constructed in one piece. The plastic foam 42 may be mixed with a pulverulent flameproofing agent 43, for example melamine resin and/or alumimium hydroxide, as indicated diagrammatically by small dashes in the region of the hatching. These flameproofing agents may of course also be added to the insert part 9 or respectively to the sitting part 8, as indicated schematically in some regions.

Furthermore, to achieve an improved ventilation of the supporting part 7 or respectively the removal of heat and moisture from the region of a seat surface 44, recesses 45 or respectively caverns have been provided which extend from the underside 13 opposite of the seat surface 44 very closely to the upper side 14 of the supporting part 7. However, it is also possible to arrange perforations 46 from the underside 13 of the supporting part 7 up into the region of an upper side 47 of the sitting part 8. This arrangement of recesses 45 or perforations 46 may also, if desired, lead to an improved sitting climate or to a further reduction in weight in the insert piece 9.

The sitting part 8 is formed by a foamed plastic 48 preferably running so as to become narrower from the front edge 11 in the direction of the rear end edge 25 but in an advantageous manner not imperatively with a lower specific gravity with respect to the supporting part 7. The hardness of the sitting part 8 is of between 120 N and 300 N, preferably 180 N at a specific gravity of between 35 kg/m$^3$ and 55 kg/m$^3$. The sitting part 8 is surrounded with a sandwich structure 50 on an upper side 47 and in the direction of the supporting part 7 or respectively insert piece 9 projecting over the bearing face 49 of the sitting part 8.

Through the greater hardness of the insert piece 9 relative to the supporting part 7, a resistance zone is formed which is secure with respect to height, which in the direction of the thickness of the seat padding can be less compressed than the zones surrounding the insert piece. Therefore, the insert piece, by virtue of its higher deformation resistance acts in the case of pressure loads as a kind of barrier or abutment piece, which in cooperation with the inclined support face 20 gives the user of the vehicle seat the feeling not to slip off the seat. Hence, a certain abutment piece effect or holding resistance is built up which gives the user even when he sits badly or is in a sitting position whereby the backside is in the front marginal portion of the vehicle seat, a feeling that he can take a quiet and relaxing seat position by building up sufficient counterweight.

A purposeful reinforcement in the region of the front face of the vehicle seat is improved by the elastic properties of the softer sitting part 8 or sandwich structure 50 with respect to the sitting comfort. Thus, the sitting comfort is improved in the sitting area and the bearing capacity and lifespan of the seat padding is increased. Furthermore, the lifespan and spring properties of the sitting part are also improved, since the latter is protected against excess stresses in the region of the front edge of the seat padding 4 by excessive compression in the direction of thickness with respect to the support frame. Moreover, it is possible to separate the softer sitting part 8 in the connecting area to the insert piece 9 and also the supporting part 7, so that for example after a certain period of use, the sitting part 8 can be removed together with the sandwich structure 50 as this area of the seat padding 4 presents in most cases a high degree of soiling caused by humidity or liquids entering from above. The sandwich structure remaining on the supporting part 7 or the insert piece 9 is removed thereafter, and a new and cleaned sitting part 8 with a new sandwich structure 50 on the supporting part 7 or the insert piece 9 is merely to be mounted. This saves considerable costs with respect to cleaning or exchange of parts of the seat padding 4, as only a small portion of the volume of the entire seat padding must be exchanged or respectively cleaned.

The sandwich structure 50 comprises an intermediate layer 51, for example a fabric or knitted material, a net or a lattice of high temperature resistant fibres or threads 52 of glass or respectively plastic and/or metal and/or ceramics and/or graphite, and an intermediate layer 53 and also a substrate layer 54. This intermediate layer 51 which is connected by means of an adhesive 55 with the supporting part 7 in areas distributed over the upper side 47, is at the same time also connected in a frictional and form-locking manner with the intermediate layer 53. Thereby, the adhesive 55 penetrates the fibre layer 58 of a batt 59 which consists of fibres and threads 56, 57 and thus creates an intensive frictional composite structure between the supporting part 7 and the fibre layer 58. Thereby, of course, it is also possible that the intermediate layer 51 is connected with the fibres and threads 56, 57 of the fibre layer 58 through needle-punching. The intermediate layer 51 has a mesh width of between 0.5 to 8 mm, preferably 3 mm, at a surface weight of between 80 g/m$^2$ and 185 g/m$^2$, preferably 120 g/m$^2$.

According to the invention, the threads 57 may also be produced from a plurality of fibres 56 as indicated diagrammatically with one of the threads 57 in FIG. 2. Preferably, these threads 57 can be composed of filaments whereby they present high resistance values and a corresponding surface roughness for good connection during knitting or needle-punching, but have bending looseness or bending softness which results only in minimal resilient forces. Thereby, one achieves an overall elastic body with an approximately uniform deformation behaviour which shows a high degree of adaptation.

The fibres or threads 56, 57 of the fibre layer 58 may predominantly consist of natural material such as wool or cotton. On the other hand, it is also possible to use only plastic fibres or threads 56, 57 or to mix the plastic fibres or threads 56, 57 with natural materials in any way possible. If the fibres and threads consist of natural materials, they may consist of cotton, wool, flax, or the like, whereas plastic fibres or threads 56, 57 consist of polypropylene and/or polyethylene and/or polyacrylate, but may also consist of polybenzimidazole and/or aromatic amides, which form a portion of between 5% and 20%, preferably 10%.

The higher the portion of fibres or threads 56, 57 of aromatic amides or filaments or respectively polybenzimidazole, the higher is the melting temperature of fibre layers 58 mixed with such fibres or threads 56, 57. This is so because aromatic amide or polybenzimidazole fibres or threads 56, 57 have a fusion temperature of more than 1000° C.

Provision is made here, that the fibres or threads 56, 57 of the fibre layer are strengthened for example by means of thermal cracking or thermal connection. Therefore, it is advantageous that these fibres or threads 56, 57 consist of thermoplastics. Especially thermoplastics show mostly a plasticizing or melting point between 100° and 150° C., preferably between 100° and 120° C., which favours a thermal connection of fibres or threads 56, 57 or a thermal strengthening of the batt 59.

It is, of course, also possible to use fibres or threads 56, 57 for the the fibre layer 58 which are produced from polyamides. Furthermore, it is recommended for the fibres or threads 56, 57 of the fibre layer 58, especially if they consist of polypropylene or aromatic amide or polyamide, that they have a titre, i.e. a weight/length ratio of 2 to 8 dtex, preferably 3.5 dtex. Since the fibre layer 58 is produced in that the individual fibres or threads 56, 57 adhere to one another only through needle-punching or respectively entanglement and in certain cases through thermal connection, i.e. through simultaneous action of pressure and temperature, or respectively are held in the slack mat forming the batt 59, it is important to achieve a high tensile strength and ultimate strength especially at low specific gravity of such a batt, to use the fight length of the fibres or threads 56, 57 to produce the fibre layer 58. Thereby, a length of 40 to 80 mm proved particularly advantageous.

Here, it must be taken into account when producing this batt, that the fibres or threads 56, 57, for example of cotton, wool, flax or of polyamide, polyester, PVC, PP, PE or nylon or respectively aromatic amide and the like must be applied as bulk goods, for example on a substrate layer 54 serving as a conveying belt. During the forward movement of the bulk goods on this substrate layer, this entanglement of fibres or threads 56, 57 is mostly needle-punched or interlocked by means of barbed needles in order to form a coherent interconnected body. This connection depends on the fact if the substrate layer is connected with the fibre layer through fibres or threads 56, 57 or if the conveying belt is a continuously revolving machine part.

According to such a method described hereabove, it is then possible to use specific gravities of the fibre layer of the batt between 10 and 80 kg/m$^3$ which have sufficient resistance strength for stress areas occurring for the seats. Thus, a weight per square meter of the fibre layer 58 of the batt 59 at a thickness of approximately 5 mm is between 60 and 390 g/m$^2$, preferably 70 g/m$^2$. If the strengths of a batt 59 produced in such a manner are enough, it is possible when using plastic fibres or threads 56, 57 that the batt achieves a surface weight between 300 and 500 g/m$^2$ at a thickness of 5 mm for example, through a subsequent thermal compression.

A further advantage in producing such a batt, beside the lower specific gravity or surface weight, in particular when used in vehicles and aircraft, is that it can be connected with a substrate layer 54, in particular in the surface regions, without additional layers and thus without additional weight in order to reinforce it.

Furthermore, this fibre layer 58 is formed as a batt 59 through needle-punching or also through thermal adhesive connecting and at the same time is motionally connected with the substrate layer 54, which can also consist of a net or lattice or fabric, knitted material or the like of plastic for example, such as polyamide or polyester. For this, it has threads 60, which consist of 100% polyester or respectively 100% polyamide and which have a diameter 61 or a dtex 22/1 or 44F10. A substrate layer 54 formed in such a way has thereby 80 to 180, preferably 130 to 140 stitch rows/dm length or respectively 40 to 140, preferably 60 to 120 stitch wales/dm length, which consist of three times 400 to 1500, preferably 580 to 1160 threads per surface unit.

Such a net, which may form the substrate layer 54, can have a weight of between 15 to 90 g/m², preferably 35 g/m².

It has been proved advantageous if this net has a mesh density of 12 openings/dm. Furthermore, the substrate layer should withstand a tensile strength of approximately 200 to 500 N and the tear resistance of the substrate layer should be between 240 and 500 N/cm.

The fibres or threads of the substrate layer 54 may also be formed from filaments, whereby it is possible that at least individual filaments can consist of preoxidised polyacrylate, aromatic amide or polybenzimidazole and/or natural materials.

For the preferred use of the substrate layer in the region of seats, in particular in aircraft, a longitudinal and transverse extension between 30 and 50%, preferably between 34 and 44% is recommended.

In this connection, it is also advantageous if the substrate layer 54 has bending softness or respectively bending looseness and presents a very low resilience value. This prevents that the substrate layer 54, which reinforces the batt 59 according to the invention, impairs the sitting comfort or respectively in the bending region between the horizontal and vertical faces of the seat padding 4 of the double bench seat 1 chafes or destroys an upholstery material 62.

On this substrate layer 54 forming a surface 63 of the batt 59 lies the seat surface 44 forming upholstery material 62, which in most cases only envelops the sandwich structure 50 comprising a supporting part 7, an intermediate layer 51, an intermediate layer 53 and the substrate layer 54, and which is fixed on the supporting part 7 or insert piece 9 by means of burred tapes 64.

As can be seen best from FIG. 2, the sandwich structure 50 extends in the region of the rear end edge 25 to the underside 13 of the supporting part 7 and in addition, is overlapped at its front edge by the protective layer 26. In the region of the front edge 11 of the seat padding 4 a front edge of the sandwich structure 50 extends upward to the height of a from face 65, which is formed by shanks 66 projecting over the underside 22 of the insert piece 9 in a region facing away from the upper side 18. The protective layer 26 extends therefore, as described hereabove, from the rear end edge 25, coveting the undersides 13 or 22 and the shanks 66, into the region of the surface 63 of the substrate layer 54.

The fixing of the upholstery material 62 on the seat padding 4 can be seen from different application cases or a plurality of prepublished publications, which is the reason why these details are not explained more closely.

As can be seen better from FIG. 3, the insert piece 9 has the same width 67 than the sitting part 8 or the supporting part 7. Thus, the seat padding 4 has flat-surfaced lateral edges 24, which starting from the front face 65 of the shank 66 and the upper side 47 of the sitting part 8 is enveloped extending from the intermediate layer 51 of the sandwich structure 50.

The connection between the sitting part 8 and also the supporting part 7 and the insert part 9, can take place by any connection between foamed plastics known from prior art. Thus, it is possible for example to foam on the sitting part 8 with its bearing face 49 directly onto the upper sides 14 or 18 of the supporting part 7 or the insert piece 9. However, it is of course also possible to select a connection, as described already by means of the connection between the supporting part 7 with its front face 15 and the insert piece 9 with its connecting surface 16. Furthermore, it is also possible to use various burred tapes or other adhesive materials as a connecting device.

FIG. 4 shows a plan view of the seat padding 4 with a partially lifted sandwich structure 50. This structure consists, as described hereabove, of an intermediate layer 51, the fibre layer 58 of the batt 59 and also the substrate layer 54. This sandwich structure 50 is surrounded from all sides by the upholstery material 62.

Downstream of the lifted up sandwich structure 50, the sitting part 8 and thereafter beneath the sitting part 8, the supporting part 7 and the insert piece 9 connected thereto, can be seen.

The seat padding 4 with a width 71 has a depth 72 whereby a central line 73 of the spring core 10 seen towards the depth 72 is arranged at a distance 74 from the front edge of the seat padding 4. The distance 74 corresponds thereby approximately ⅔ of the depth 72 of the seat padding 4 and is arranged in the region of the seat surface 44 which is mostly stressed.

Figure 5:
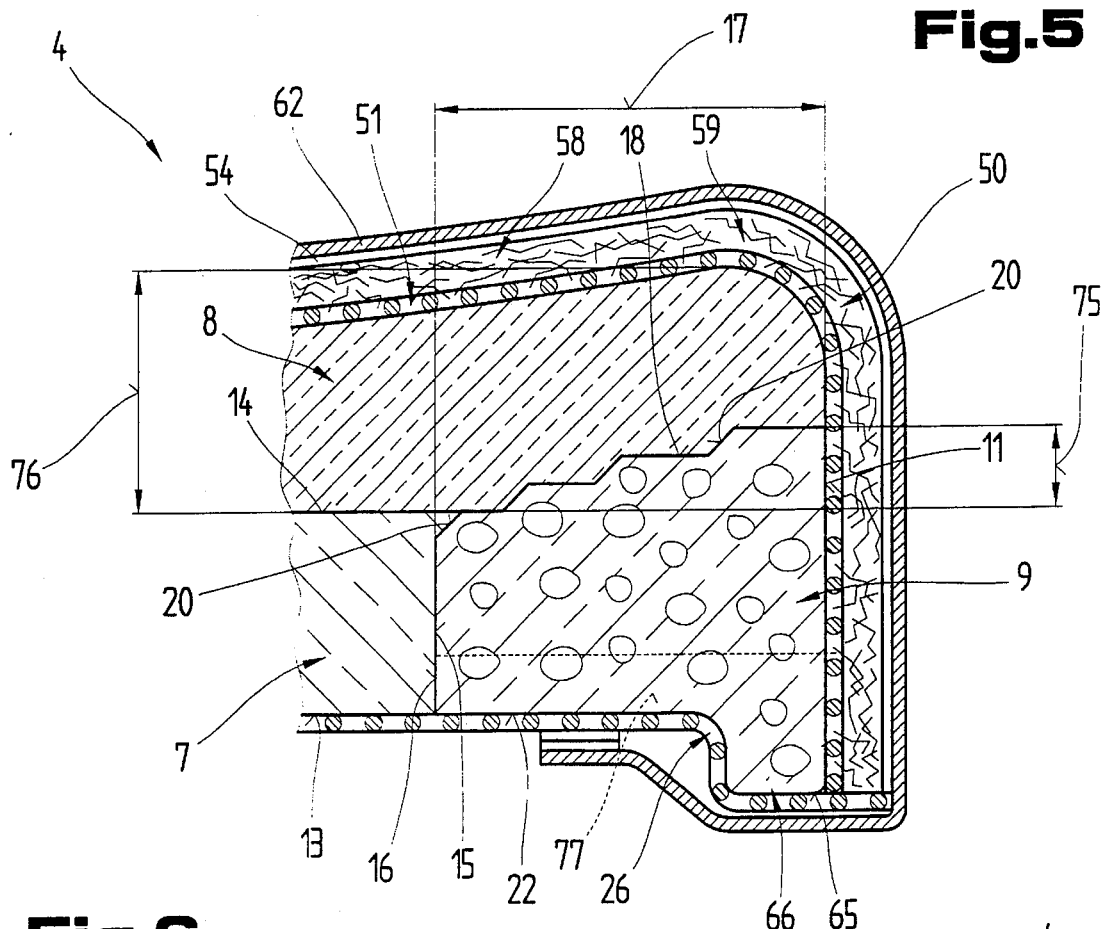
FIG. 5 shows another version of an embodiment of the seat padding, in side view, in section.
Figure 6:
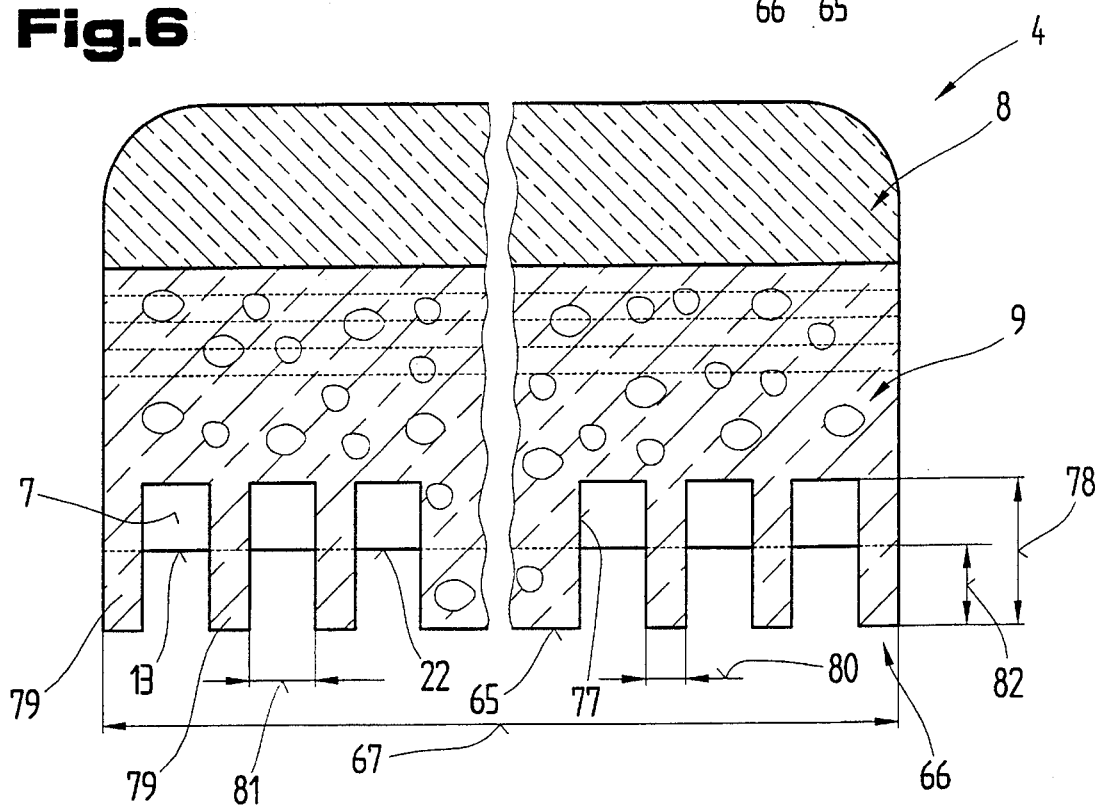
FIG. 6 shows the seat padding of FIG. 5, in from view and with the protective layer removed.

FIGS. 5 and 6 show a variant embodiment for the insert piece 9, wherein for identical parts identical reference numbers have been used.

The supporting part 7 is connected with its face 15 to the connecting surface 16 of the insert piece 9. The connection of these two faces can take place in different ways as described in more detail in the preceding figures. The difference in the construction of the insert piece 9 consists by comparison with the embodiment illustrated in FIG. 2 in the fact that the upper side 18 of the insert piece 9 projects about a height 75 over the upper side 14 of the supporting part 7 in the direction of the sitting part 8. The upper side 18 of the insert piece 9 presents several support faces 20 which are offset to one another and which are constructed again in a way to be inclined towards the front edge 11. The offsetting to one another of the individual support faces 20 occurs towards the depth 17 or continuously over the entire width 67 of the seat padding 4. This leads to the development of an imbricated or step-like structure of the upper side 18.

The inclination of the individual support faces 20 with respect to the connecting surface 16 can be carried out differently depending on the case of use or utilisation. This way, the various inclinations of the individual support faces to one another achieve a different support characteristic of the sitting part 8 on the insert piece 9. The height 75 of that part of the insert piece 9 which projects over the upper side 14 of the supporting part 7 in the direction of the sitting part 8, corresponds thereby approximately to 30% of a maximum thickness 76 of the sitting part 8.

FIG. 6 shows the seat padding 4 according to the embodiment in FIG. 5 in a front view with removed sandwich structure 50.

The sitting part 8 overlaps the supporting part 7 as well as the insert piece 9. The insert piece 9 shows in the area of its underside 22 recesses 77 which extend from the from face 65 of the shank 66 into a height 78 towards the sitting part 8. These recesses 77 are arranged in their longitudinal extension in a plane which is aligned perpendicular to the front edge 11 of the insert piece 9 and reach over the entire depth 17 up to the connecting face 16. However, it is also possible to arrange the recesses 77 only over a portion of the depth 17. Between the individual recesses 77 support foot-like individual projections 79 having a width 80 are formed. The recesses 77 have thereby a capacity 81 which extends in the direction of the width 67 of the seat padding 4. The shank 66 or respectively the support foot-like projections 79 project over the underside 22 of the insert piece 9 about a height 82 in a direction opposed to the sitting part 8.

By varying the width 80 of the projections 79 respectively the capacity 81 of the recesses 77 with respect to the width 67 of the seat padding 4 various damping characteristics of the overall structure of the seat padding 4 on the support frame 5 can be achieved in a simple manner. Furthermore, by varying the height 78 of the recesses 77 it is possible to regulate the air supply and air release in the region of the seat surface 44 and hence to achieve a favourable sitting climate in particular during long-haul flights.

Flameproofing agents 43 can be added to the supporting part 7 and also to the sitting part 8 and the insert piece 9 according to the preceding exemplary embodiments. This arrangement of recesses 45 or perforations 46 can also be selected in any way possible.

Figure 7:
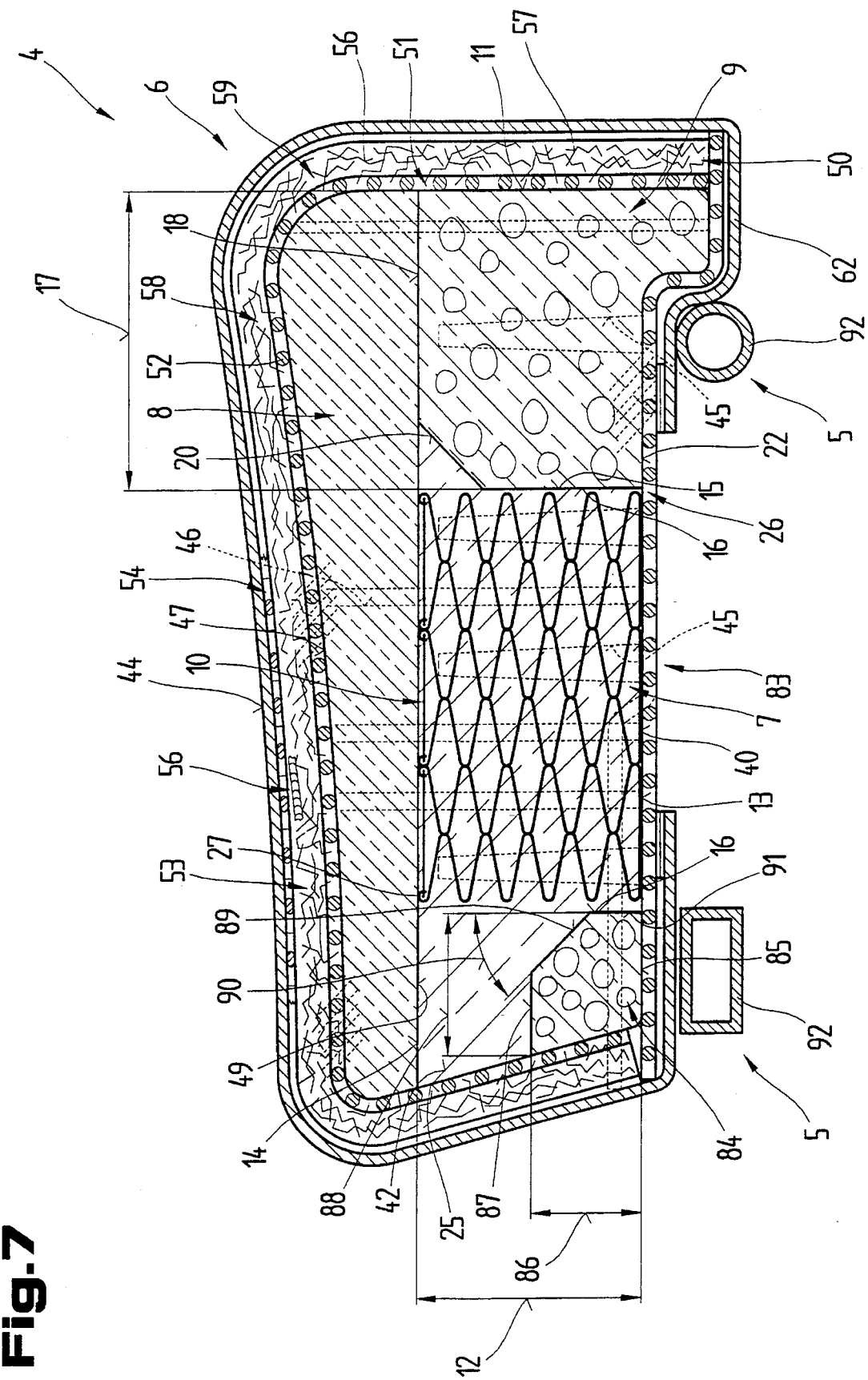
FIG. 7 shows another form of an embodiment of a seat padding with a further insert piece, in side view, in section.

FIG. 7 shows another variant embodiment of the seat padding 4 whereby identical reference numbers have been used for identical parts.

Hence, in this form of embodiment the seat padding 4 consists also of the supporting part 7, a sitting part 8, an insert piece 9, the sandwich structure 50 with the upholstery material 62 and also the protective layer 26 on the underside 13 or 22 of the supporting part 7 or respectively the insert piece 9.

In addition to the components mentioned hereabove, a further insert piece 84 is arranged between the rear end edge 25 of the supporting part 7 and the central region 83 of the latter. The insert piece 84 is arranged with its underside 85 in a flat-surfaced manner to the underside 13 or 22 and extends over the entire width 67 of the supporting part 7 or the insert piece 9. A thickness 86 of the insert piece 84 is between 20 and 80%, preferably 30 and 50% of the thickness 12 of the supporting part 7, whereby an upper side 87 is covered by an upper side 14 of the supporting part 7. The connecting surface 16 of the insert piece 84 is arranged from the rear end edge 25 of the seat padding 4 at a distance about a depth 88 in the direction of the front edge 11 of the seat padding 4, which can be between 30 mm and 100 mm.

Between the connecting surface 16 and the upper side 87 is also a support face 89 which, starting from the connecting surface 16 in the direction of the rear end edge 25 of the supporting part 7 runs inclined about an angle 90 and extends over the full width of the insert piece 84.

The additional insert piece 84 consists also of a polyethylene foam having a specific gravity between 15 and 50 kg/m$^3$, preferably 25 kg/m$^3$ at a hardness between 30 and 100 kPa at 40% depth of impression whereby the plastic foam has preferably a closed-cell structure. The connection between the insert piece 84 with its connecting surface 16 and a rear end face 91 of the supporting part 7 can take place in various manners as described already in more detail in FIG. 2.

In order to achieve sufficient protection of the seat padding from damages or the action of the flames originating from underneath, the undersides 85, 13 and 22 are covered by the protective layer 26 which is preferably connected with the insert piece 84, the supporting part 7 and also the insert piece 9 by adhesive points spaced apart from one another in certain regions.

The layers of the sandwich structure 50 correspond to those layers, as described in detail in FIG. 2, and consist of an intermediate layer 51 with threads 52, the central layer 53 and the substrate layer 54. The central layer 53 is constructed as fibre layer 58 in the shape of the batt 59 from different fibres 56 or threads 57. The entire sandwich structure 50 and portions of the underside of the seat padding 4 are covered with upholstery material 62.

The sitting part 8 extends from the front edge 11 of the seat padding 4 over the entire width to the rear end edge 25 and covers thereby with its bearing face 49 the upper side 14 of the supporting part 7 and also the upper side 18 of the insert piece 9, and in the region of the upper side 47 is formed so as to become narrower from the front edge 11 in the direction of the rear end edge 25. The hardness of the sitting part 8 is also of between 120 N and 300 N, preferably 180 N at a specific gravity between 35 kg/m$^3$ and 55 kg/m$^3$.

Beneath the two insert pieces 9 or respectively 84, stay pipes 92 of the support frame 5 are arranged or respectively the seat padding 4 is supported by the latter. Through this arrangement and also through the greater hardness of the two insert pieces with respect to other components of the seat padding 4, with the eyes of the user the supporting effectiveness of the seat padding 4 is seen to be influenced in a favorable manner. With a load of 14 G on the seat surface 44 of the seat padding 4, the seat padding 4 bears on the stay pipes 92 of the support frame 5 by means of the insert pieces 9 or 84. This way, the supporting part 7 can be produced with less strength or a higher elastic deformation, and in spite of this fact a more stable position of the seat padding can be assured in the support frame 5 or respectively its stay pipes 92 by means of the insert pieces 9 or 84.

This way, in particular the backside of the user of such a seat padding is centered between the two insert pieces 9 and 84, which gives the user a better sitting comfort.

A further advantage of this arrangement of the insert pieces 9 or 84 acting as abutment pieces lies in the fact, that for example at so-called inclined load tests whereby a load of 16 G acts diagonally towards the front on the seat padding, an improvement in safety for the user of such an aircraft seat takes place, because even with these high loads a high damping effect is achieved through the insert piece 9, 84, and in particular, which prevents the user from falling out of the seat at high speed and from getting injured at impact on the front seat. The advantage of the used polyethylene foam having the given greater hardness, in particular with the closed-cell embodiment, lies in the fact that during the deformation of the cell structure under pressure, the latter is compressed and the energy of deformation to be used for this compression is used to decrease the energy through the high acceleration of gravity and thereby is protecting the user of such a seat from injuries at an impact or collision.

Depending on the desired protection it is thereby possible to arrange an insert piece only in the region of the front edge 11 or the rear end edge 25. With seats which are only exposed to loads directed vertically against the bearing face, an arrangement of a single insert piece 84 in the region of the rear end edge 25 may be sufficient whilst especially at a stress of the seat also in a direction diagonally towards the from, the arrangement of only one insert piece 9 in the region of the front edge 11 may prove to be enough.

In order to achieve overall protection, it is, however, also possible, to arrange the two insert pieces 9 and 84 together in one supporting part 7. Thereby, it is also advantageous that through the increase in strength a simultaneous additional loss of weight of the seat padding is achieved, which lowers the operating costs of a vehicle equipped with such seats, in particular an aircraft. Thereby, it must be taken into account that the reduction in weight is considered to be particularly high and advantageous in permanently installed aircraft equipment since this weight has to be carried along with each flight independently of the number of passengers.

When testing seat paddings 4 which have been formed in such a manner, it was found out that with such high stresses on the insert pieces 9 or 84, the cellular structure of the foamed body is pressed together by the stay pipes 92 of the support frame 5, which makes it possible that the deformation path can be used as damping path. Thus, such an impact is damped and the user of such a seat is protected from injuries by parts of the support frame 5 sticking through.

Furthermore, it is possible to arrange the spring core 10 in the central area 83 of the supporting part 7 between the two connecting surfaces 16 of the insert pieces 9 or 84 in the supporting part 7, which, however, is not obligatory. The feature of the embodiment of the spring core 10 shown here is different from the feature of embodiment illustrated in FIG. 2 in that the node points 27 of the bearing face 49 are allocated to the sitting part 8 whereby the node points are close to the upper side 14 of the supporting part.

In this exemplary embodiment the upper side 40 of the spring core 10 is facing towards the underside 13 of the supporting part 7. The longitudinal extension of the spring core 10 corresponds approximately to the thickness 12 of the supporting part 7. It is however also possible, as already described in FIG. 2, to arrange the node points 27 or the upper side 40 at a distance from the upper side 14 or the underside 13 of the supporting part 7.

It is also possible to arrange recesses 45 or perforations 46 in the supporting part 7 as well as in the insert pieces 9 or 84 and also the sitting part 8 in order to favour the sitting climate by a regulated air supply or air exhaust.

Furthermore, in connection with the selected arrangement of the insert pieces 9 or 84 or their arrangement together, it must be mentioned that independent of their arrangement in a supporting part 7 or in a supporting and sitting part 7 or 8, they can be used with any possible construction of a seat padding 4. In particular, it does not matter at all what kind of layers are covering the supporting or sitting part in the region of the seat surface 44, the front edges 11 or 25 and the lateral edges 24.

In particular, the idea of a solution for the arrangement of these insert pieces according to the invention is neither connected with the structure nor the existence of a sandwich structure 50, but can be used totally independently thereof. These advantages can be used in particular also for seats in railway wagons or the like, especially in high-speed trains where similar high stresses can occur at an impact or respectively emergency stopping.

For good order's sake it must be taken into account for a better understanding of the invention that the seat paddings 4 illustrated in the drawings are partially schematically and dimensionally unproportionally depicted. Moreover, the individual thicknesses of the various layers are presented in a strongly distorted manner and untrue to scale. Individual features of the described versions of embodiments of the seat padding 4 may also form their own solutions in accordance with the invention.

In particular, the individual embodiments shown in FIGS. 1, 2 to 4; 5, 6; 7 can form the object of own solutions in accordance with the invention. Relating tasks and solutions are apparent from the detailed descriptions of these figures.

What is claimed is:

1. A seat padding for a vehicle seat comprising a supporting body and an outer covering material, the supporting body extending from a front edge through a center region to a rear edge and having lateral edges defining the width of the supporting body, the front and rear edges defining the depth of the supporting body, and the supporting body comprising (a) a supporting part of a resilient plastic foam having a first specific gravity, the supporting part having
      (1) an upper side and
      (2) an underside opposite the upper side,
   (b) a sitting part of a resilient plastic foam having a second specific gravity which is less than the first specific gravity, the sitting part having
      (1) an upper side and
      (2) a bearing face opposite the upper side,
      (3) the bearing face of the sitting part facing the upper side of the supporting part and
      (4) the sitting part being superposed on the supporting part and being connected thereto, and
   (c) an insert piece of resilient plastic foam forming a portion of the supporting part and being arranged between the front edge of the supporting body and about the center region thereof, the insert piece
      (1) having a third specific gravity which is less than at least one of the specific gravities of the parts and a hardness greater than that of at least one of the parts,
      (2) extending over at least a portion of the thickness of the supporting part, and
      (3) having a connecting face facing a front end face of the supporting part, the connecting and front end faces being connected to each other.

2. The seat padding of claim 1, comprising a further insert piece forming a portion of the supporting part and being arranged between the rear edge of the supporting body and about the center region thereof, the further insert piece extending over at least a portion of the thickness of the supporting part, and having a connecting face facing a rear end face of the supporting part, the connecting and rear end faces being connected to each other.

3. The seat padding of claim 2, wherein at least one of the insert pieces extends over 20% to 80% of the thickness of the supporting part.

4. The seat padding of claim 2, wherein at least one of the insert pieces extends over at least a portion of the thickness of the sitting part.

5. The seat padding of claim 4, wherein the portion of the thickness of the sitting part does not exceed 30% of the thickness.

6. The seat padding of claim 2, wherein the insert pieces have an identical specific gravity.

7. The seat padding of claim 2, wherein at least one of the insert pieces consists of a closed-cell plastic foam.

8. The seat padding of claim 7, wherein the closed-cell plastic foam is a polyethylene foam.

9. The seat padding of claim 2, wherein at least one of the insert pieces has a specific gravity of 15–50 kg/cu.m.

10. The seat padding of claim 2, wherein at least one of the insert pieces extends over the width of the supporting body.

11. The seat padding of claim 2, wherein the connecting face of at least one of the insert pieces comprises at least two support faces which are offset from each other in the direction of the depth of the supporting body.

12. The seat padding of claim 11, wherein respective ones of the support faces are inclined to each other to form steps.

13. The seat padding of claim 1, wherein the insert piece has a shank adjacent the front edge and projecting beyond the underside of the supporting part.

14. The seat padding of claim 13, wherein the shank has support legs projecting beyond an end face of the shank.

15. The seat padding of claim 2, wherein at least one of the insert pieces is flame-resistant.

16. The seat padding of claim 1, wherein the supporting part has a hardness from 350 N to 550 N.

17. The seat padding of claim 1, wherein the sitting part has a hardness from 120 N to 300 N.

18. The seat padding of claim 1, further comprising a flame-resistant intermediate layer of high temperature-resistant fibrous material arranged between the supporting body and the outer covering material.

19. The seat padding of claim 18, wherein the fibrous material is a lattice of high temperature resistant threads.

20. The seat padding of claim 1, further comprising a spring core embedded in the supporting part and arranged between the insert piece and the rear edge of the supporting body.

21. The seat padding of claim 20, further comprising a pressure distributing layer of wear-resistant and abrasion-proof material arranged between the spring core and the underside of the supporting part.

22. The seat padding of claim 1, further comprising a flame-retardant protective upholstery material bonded to the underside of the supporting part.

23. The seat padding of claim 1, further comprising a three-layer laminate arranged between the supporting body and the outer covering material, the laminate including an intermediate layer consisting of a batt of interconnected fibers.

24. The seat padding of claim 23, wherein the laminate further includes a substrate layer consisting of a fabric or lattice of threads of a material selected from the group of synthetic resins, glass and natural materials.

25. The seat padding of claim 24, wherein the threads have a strength of dtex of 22/1.

26. The seat padding of claim 23, wherein the substrate layer comprises 80 to 180 stitch rows/dm length.

27. The seat padding of claim 23, wherein the substrate layer comprises 40 to 140 stitch wales/dm length.

28. The seat padding of claim 23, wherein the substrate layer consists of three times 400 to 1500 threads/surface unit.

29. The seat padding of claim 23, wherein the substrate layer has longitudinal and transverse extensibility of 30% to 50%.

30. The seat padding of claim 14, wherein the substrate layer withstands a maximum tensile force of 200 to 500 N in the longitudinal and transverse directions.

31. The seat padding of claim 23, wherein the substrate layer has a tearing strength of 240 to 500 N/cm in the longitudinal and transverse directions.

32. The seat padding of claim 23, wherein the fibers of the batt consist predominantly of a natural material.

33. The seat padding of claim 32, wherein the natural material is selected from the group consisting of wool and cotton, and from 5% to 20% of synthetic resin fibers are admixed to the natural material fibers, the synthetic resin being selected from the group consisting of polypropylene, polyethylene and polyacrylate.

34. The seat padding of claim 23, wherein the fibers of the batt consist of a synthetic resin selected from the group consisting of polypropylene, polyethylene, polyacrylate and polybenzimidazole, and at least a portion of said fibers have a fusion temperature above 1000° C.

35. The seat padding of claim 23, wherein a portion of the fibers of the batt is comprised of thermoplastic synthetic resin fibers.

36. The seat padding of claim 23, wherein the fibers of the batt consist of a synthetic resin material having a melting point of 100° C. to 150° C.

37. The seat padding of claim 23, wherein the fibers of the batt have a length of 40 to 80 mm.

38. The seat padding of claim 23, wherein the batt is compressed to a weight of 300 to 500 g/sq.cm.

39. The seat padding of claim 24, wherein the laminate includes a further layer arranged on the batt opposite the substrate layer.

40. The seat padding of claim 39, wherein the further layer is connected to the fibers of the batt by needling.

41. The seat padding of claim 39, wherein the further layer consists of a fabric or lattice of fibers of an inorganic material.

42. The seat padding of claim 39, wherein the further layer has a weight of 80 to 185 g/sq.m.

43. The seat padding of claim 24, further comprising a device connecting the outer covering material to the substrate layer.

44. The seat padding of claim 43, wherein the connecting device is a burred tape.

* * * * *